United States Patent
Klas et al.

(10) Patent No.: US 10,581,952 B1
(45) Date of Patent: Mar. 3, 2020

(54) DEVICE AND METHOD FOR MANUFACTURER-INDEPENDENT INTERFACE BETWEEN MOBILE COMPUTERS AND REMOTELY ACCESSIBLE DATA STORAGE

(71) Applicant: Scruggs Equipment Company, Inc., Lancaster, SC (US)

(72) Inventors: Kevin P. Klas, Raleigh, NC (US); Donald M. Klas, Simpsonville, SC (US)

(73) Assignee: Scruggs Equipment Company, Inc., Lancaster, SC (US)

( * ) Notice: Subject to any disclaimer, the term of this patent is extended or adjusted under 35 U.S.C. 154(b) by 276 days.

(21) Appl. No.: 15/330,849

(22) Filed: Nov. 7, 2016

Related U.S. Application Data

(60) Provisional application No. 62/252,184, filed on Nov. 6, 2015.

(51) Int. Cl.
*H04L 29/08* (2006.01)

(52) U.S. Cl.
CPC .............. *H04L 67/06* (2013.01); *H04L 67/02* (2013.01); *H04L 67/1097* (2013.01); *H04L 67/303* (2013.01); *H04L 67/306* (2013.01)

(58) Field of Classification Search
CPC ...................................................... H04L 67/06
See application file for complete search history.

(56) References Cited

U.S. PATENT DOCUMENTS

| | | | | |
|---|---|---|---|---|
| 7,321,310 B2* | 1/2008 | Curkendall | .......... | A01K 11/007 340/531 |
| 7,705,735 B2* | 4/2010 | Pape | .................... | A01K 11/007 340/531 |
| 8,140,397 B2* | 3/2012 | Robinson | ............. | A01B 79/005 705/25 |
| 8,145,393 B2* | 3/2012 | Foster | .................. | A01B 79/005 460/113 |
| 8,479,221 B2* | 7/2013 | Macy | ...................... | G06F 9/542 719/318 |
| 8,521,372 B2* | 8/2013 | Hunt | ....................... | G06Q 10/00 701/50 |

(Continued)

*Primary Examiner* — Jimmy H Tran
(74) *Attorney, Agent, or Firm* — Murphy, Bilak & Homiller, PLLC

(57) ABSTRACT

Embodiments include methods, server systems, and computer-readable media that provide manufacturer-independent interface to mobile computers via a plurality of mobile communication devices. These embodiments associate a particular service account with a first mobile computer and with first and second mobile communication devices, and transmit to the first and second mobile communication devices a first download list identifying files to be transferred to a first storage device associated with the first mobile computer. Embodiments also receive from the first mobile communication device a first remove list identifying files transferred by the first mobile communication device to the first storage device. Embodiments also delete files identified on the first remove list from the portion of the data storage associated with the particular service account, create a second download list comprising the first download list but not the first remove list, and transmit to the second mobile communication device the second download list.

11 Claims, 5 Drawing Sheets

(56) References Cited

U.S. PATENT DOCUMENTS

| | | | |
|---|---|---|---|
| 8,615,257 B2* | 12/2013 | Khosravy | G06Q 30/0241 |
| | | | 455/456.3 |
| 9,344,529 B2* | 5/2016 | Killpack | H04L 69/04 |
| 9,413,852 B2* | 8/2016 | Lawson | G05B 19/4185 |
| 9,667,710 B2* | 5/2017 | Wilbur | H04L 67/10 |
| 9,986,677 B2* | 6/2018 | Valberg | A01B 79/005 |
| 10,003,910 B2* | 6/2018 | Miura | G06F 21/44 |
| 2006/0187048 A1* | 8/2006 | Curkendall | A01K 11/007 |
| | | | 340/572.4 |
| 2008/0030348 A1* | 2/2008 | Pape | A01K 11/007 |
| | | | 340/573.3 |
| 2009/0082964 A1* | 3/2009 | Robinson | A01B 79/005 |
| | | | 701/469 |
| 2010/0070145 A1* | 3/2010 | Foster | A01B 79/005 |
| | | | 701/50 |
| 2011/0126211 A1* | 5/2011 | Macy | G06F 9/542 |
| | | | 719/313 |
| 2011/0295500 A1* | 12/2011 | Hunt | G06Q 10/00 |
| | | | 701/408 |
| 2012/0264457 A1* | 10/2012 | Khosravy | G06Q 30/0241 |
| | | | 455/456.3 |
| 2013/0212420 A1* | 8/2013 | Lawson | G05B 19/4185 |
| | | | 713/400 |
| 2014/0273827 A1* | 9/2014 | Killpack | H04L 69/04 |
| | | | 455/41.1 |
| 2015/0052581 A1* | 2/2015 | Miura | G06F 21/44 |
| | | | 726/3 |
| 2016/0183458 A1* | 6/2016 | Buhler | G06F 16/178 |
| | | | 701/50 |
| 2016/0183459 A1* | 6/2016 | Buhler | G06F 16/29 |
| | | | 701/50 |
| 2016/0278277 A1* | 9/2016 | V Lberg | A01C 21/005 |
| 2016/0308954 A1* | 10/2016 | Wilbur | H04L 67/10 |
| 2016/0308958 A1* | 10/2016 | Navali | H04N 21/2662 |
| 2017/0337545 A1* | 11/2017 | Li | G06Q 20/108 |

* cited by examiner

US 10,581,952 B1

DEVICE AND METHOD FOR MANUFACTURER-INDEPENDENT INTERFACE BETWEEN MOBILE COMPUTERS AND REMOTELY ACCESSIBLE DATA STORAGE

CROSS-REFERENCE TO RELATED APPLICATION(S)

This application claims the priority of U.S. Provisional Application No. 62/252,184, entitled "Device and Method for Manufacturer-Independent Interface between Mobile Computers and Remotely Accessible Data Storage," which was filed on Nov. 6, 2015. The entirety of this priority application is incorporated herein by reference for all purposes.

FIELD OF THE DISCLOSURE

The present application relates to generally to the field of interfacing between mobile computers (e.g., field computers used in agricultural applications) and remotely accessible storage, and more specifically to methods and devices that provide an interface between particular mobile computers and remotely accessible storage that can be intermittently connected and are not otherwise compatible, e.g., due to lack of interoperability between manufacturer(s) and/or service provider(s).

BACKGROUND INFORMATION

Agricultural equipment, such as granular and liquid applicators, planters, and harvesters, often make use of electronic control systems to manage product application rates and monitor yield based on location coordinates, e.g., coordinates provided by a GPS receiver (also referred to herein as "GPS coordinates"). These systems can include an application specific computer (often referred to as a "field computer") coupled with a control module. The field computer can provided the user interface and data management while the control module can interface to systems of the agricultural equipment. These two parts can be aggregated into a single, physical unit or be configured as separate and distinct physical units.

Among other tasks, a field computer often can record application and/or yield data associated with GPS coordinates. This information can be used for a number of purposes including tracking profitability of a field or portion(s) thereof, as inputs for future application rates, and for application records compliance. A field computer can also make use of prescription maps to apply product at different rates based on GPS coordinates and is capable if sharing agricultural data such as field boundaries and navigation guidance lines.

In many of these tasks, data can be exchanged between the field computer and one or more outside sources. This data typically originates and terminates from a specialized software application running on a general purpose computer. There are a number of companies that provide this specialized software. Some of these companies make field computers and provide an integrated system from the field computer to the specialized software while others may provide only software. In either cases, getting data from the field computer to remote storage to allow these software programs to operate on them can be challenging and costly.

Two methods have seen commonly used to transfer this data between a field computer and remote storage. First, the data files are manually copied from the field computer to a removable media such as a USB drive. The removable media is then plugged into a general-purpose computer, which can upload the data files to remote storage via the Internet. This method requires significant user intervention and the user may not have ready access to a general-purpose computer capable of uploading the data files.

Second, a field computer can be connected to the Internet via a cellular modem and can be configured to send the data files to cloud storage associated with the field computer manufacturer. Operation of this method requires availability of a cellular network in the field—not a given in many rural, agricultural areas of the world, even in North America. This method is further restricted in that a given manufacturer only transfers data between its own field computers and its own proprietary storage (or other specifically-supported storage), possibly in a proprietary or processed (non-raw) format. This effectively locks in users to that manufacturer's total solution regardless of the capabilities of the individual components. This lack of access can be a particular problem for users (e.g., farmers) who either own or wish to own a mixed fleet of equipment from manufacturers using different formats, or who wish to use raw data for processing by a third party (e.g., a chemical supplier or agronomist).

Although the preceding examples are in the agricultural field, it is believed that the above-described problems of intermittent connectivity and multi-manufacturer compatibility between a plurality of mobile computing devices and remote data storage exist in many other fields.

Thus, there may be a need to address at least some of the inadequacies, issues, and/or concerns with existing data interface and interchange techniques described above. In particular, there is a need for technological solutions to improve the function of computer and communication systems used in agricultural applications.

SUMMARY OF EXEMPLARY EMBODIMENTS

Accordingly, to address at least some of such issues and/or problems, certain exemplary embodiments of methods, systems, devices, and computer-readable media of the present disclosure can utilize a user-friendly, manufacturer-independent data interface between mobile computers (e.g., field computers used in agricultural applications) and remotely accessible storage and/or applications (e.g., "cloud solutions"). Such exemplary embodiments of methods, systems, devices, and computer-readable media of the present disclosure can vastly out-perform conventional methods, techniques, and systems in various known applications, including exemplary applications discussed herein. For example, such exemplary embodiments can enable users to easily create "best in class" solutions by combining mobile computers (e.g., field computers) and cloud solutions from different vendors, which would otherwise not be compatible due to differing data formats and/or interfaces. In addition, exemplary embodiments can utilize a store-and-forward approach that eliminates the conventional requirement for cellular service in the operational area of the field computer. In this manner, such exemplary embodiments provide technological improvements to usability, compatibility, flexibility, and performance of computer and communication systems used in agricultural applications.

Some exemplary embodiments include a mobile communication device comprising a transceiver, at least one processor, at least one memory comprising computer-executable instructions that, when executed by the at least one processor, cause the device to: connect to the remote data storage via an available communication channel; transmit to the remote data storage a first remove list corresponding to files previously transferred by the mobile communication device to a first storage device associated with a first mobile computer; receive from the remote data storage a second download list identifying files to be transferred to a second storage device associated with a second mobile computer; and delete one or more files that are identified in the second download list but not in a locally-stored first download list of files to be transferred to the second storage device. In addition to such exemplary mobile communication device embodiments, other exemplary embodiments include said non-transitory, computer-readable media, as well as methods embodied by said computer-executable instructions stored on said non-transitory, computer-readable media.

Other exemplary embodiments include a computer server system comprising at least one processor, a data storage that is accessible via one or more service accounts, and at least one memory comprising computer-executable instructions that, when executed by the at least one processor, cause the system to: associate a particular service account with a first mobile computer, a first mobile communication device, and a second mobile communication device; transmit to the first and second mobile communication devices, via available communication channels, a first download list identifying files to be transferred to a first storage device associated with the first mobile computer; receive from the first mobile communication device a first remove list identifying files transferred by the first mobile communication device to the first storage device; delete files identified on the first remove list from the portion of the data storage associated with the particular service account; create a second download list comprising the first download list but not the first remove list; and transmit to the second mobile communication device, via an available communication channel, the second download list. In some exemplary embodiments, the first storage device can be removably connected to the first mobile computer. In some exemplary embodiments, the first storage device can be integral with the first mobile computer. In addition to such exemplary computer server system embodiments, other exemplary embodiments include said non-transitory, computer-readable media, as well as methods embodied by said computer-executable instructions stored on said non-transitory, computer-readable media.

These and other objects, features and advantages of the exemplary embodiments of the present disclosure will become apparent upon reading the following detailed description of the exemplary embodiments of the present disclosure, when taken in conjunction with the appended numbered paragraphs.

BRIEF DESCRIPTION OF THE DRAWINGS

Further objects, features and advantages of the present disclosure will become apparent from the following detailed description taken in conjunction with the accompanying Figures showing illustrative embodiments, in which.

While the present disclosure will now be described in detail with reference to the figures, it is done so in connection with the illustrative embodiments and is not limited by the particular embodiments illustrated in the figure(s) or in the appended numbered paragraphs.

DETAILED DESCRIPTION OF EXEMPLARY EMBODIMENTS

Various exemplary embodiments of the present disclosure can provide a capability for users to move data files from mobile computers (e.g., an application-specific computing device) produced by various manufacturers to remotely accessible storage (e.g., cloud-based storage) using readily available mobile devices, such as a smartphone or tablet. For example, various exemplary embodiments of the present disclosure can provide the capability to selectively download data from such a mobile computer to such a mobile device. In addition, various exemplary embodiments of the present disclosure can provide capability to identify and/or select application-specific data files stored on the mobile device for purposes including transmission to remote storage. Furthermore, exemplary embodiments can provide the capability to transfer data files between a plurality of mobile computers and a remote data storage, using a plurality of mobile communication devices as intermediaries to overcome intermittent connectivity between the mobile computers and the remote data storage. Such exemplary embodiments can provide various capabilities to manage the data files stored on the intermediary mobile devices, e.g., to avoid transfer of duplicate and/or invalid files.

Furthermore, exemplary embodiments pertaining to agriculture enable field application data and machine configuration data—including, but not limited to, as-applied maps, coverage maps, yield maps and any other such data—collected by an in-cab field computer to be made readily accessible to one or more entities via a remote or distributed storage. Various exemplary embodiments also enable various data files—including, but not limited to, application prescription map files, boundary files, guidance lines, etc.—to be downloaded into a field computer from a remote location. The various embodiments of the present disclosure described herein provide such capabilities independent of the manufacturer(s) and/or service provider(s), enabling a reliable interface between device(s) and/or remotely accessible storage that would otherwise be incompatible if based on existing solutions. Moreover, various exemplary embodiments can provide the capability for users to easily move data from remote storage to other tools and entities, such as Farmworks (provided by Trimble), SMS (provided by AgLeader), Apex (provided by John Deere), Echelon, and Farm Logic.

Figure 1:
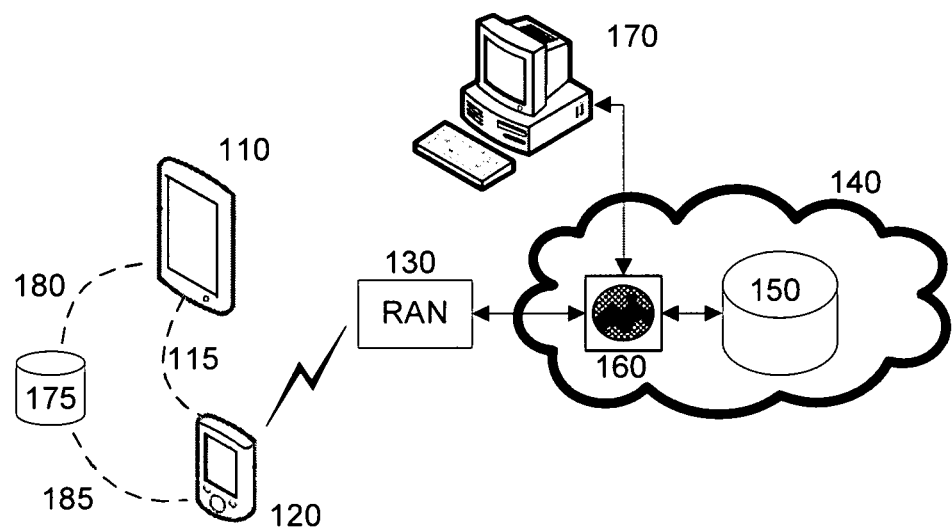
FIG. 1 is a diagram of an exemplary computing and communication system according to one or more exemplary embodiments of the present disclosure.

FIG. 1 is a diagram of an exemplary computing and communication system according to one or more exemplary embodiments of the present disclosure. System 100 comprises mobile computer 110, which in some embodiments can be an agricultural field computer (FC), such as those manufactured by Trimble. Ag Leader, John Deere, Raven, etc. Mobile computer 110 (which is also referred to herein as field computer 110 or, by abbreviation, FC 110) can be configured to store various data files pertaining to a particular application. In some embodiments, FC 110 can be configured to store various files pertaining to agricultural operations performed or to be performed upon one or more parcels of land. For example, FC 110 can be configured to store one or more prescription map (PM) files, each of which comprise one or more sets of geographic coordinates (e.g., latitude and longitude), each set defining the shape of a particular parcel; and a particular operation to be performed on the parcel, e.g., application of one or more chemicals at a particular rate to the parcel. FC 110 also can be configured to store one or more shape files, each of which comprises one or more sets of geographic coordinates, each set defining the shape or a particular parcel; a database comprising data relating to operations performed on the particular parcel; and one or more indices relating the database to the one or more sets of coordinates.

FC 110 also can be configured to communicate with one or more devices via one or more communication links, such as links 115 and 180 shown in FIG. 1 In some exemplary embodiments, one or more of links 115 and 180 can be wired, e.g., standard USB or manufacturer-proprietary, such that FC 110 can be configured to communication via an appropriate connector and cable. In some exemplary embodiments, one or both of links 115 and 180 can be short-to-mid-range wireless links, e.g., WiFi, Bluetooth, or any other wireless communication technology known to persons of ordinary skill. In such case, FC 110 can be configured to communicate using an appropriate wireless transceiver and radio protocols. Furthermore, FC 110 can be configured to send and/or receive data (e.g., shape files and/or PM files—collectively agricultural data files (ADFs)) and commands (e.g., for operation of agricultural equipment pursuant to PM files) via these wired and/or wireless communication capabilities. Although not described herein, the person of ordinary skill will readily comprehend that FC 110 can comprise additional features, such as one or more displays, a power source (e.g., Lithium battery), etc.

System 100 further comprises a mobile device (MD) 120, which can be configured to communicate with FC 110 directly via a link 115. In some exemplary embodiments, system 100 can further comprise a portable storage device (PSD) 175 that can be configured to communicate with FC 110 via link 180 and with MD 120 via link 185. In some exemplary embodiments, PSD 175 can be an AgBridge® drive (ABD) and link 185 can be a wired or wireless link, such as links 115 and 180 described above. In such embodiments, PSD 175 (e.g., ABD 175) can operate as an intermediary between FC 110 and MD 120. In other words, both FC 110 and MD 120 can be configured to exchange data (e.g., ADFs) via ABD 175, which stores data sent by one entity (e.g., MD 120) in a memory (e.g., flash memory or a solid-state drive) until such time as it can be communicated to the other entity (e.g., FC 110). Although shown in FIG. 1 as being associated with a particular FC 110, in some embodiments a particular ABD 175 can be associated with a plurality of FCs, in which case the data storage capacity of ABD 175 can be partitioned among associated FCs accordingly. In other exemplary embodiments, the functionality of ABD 175 can be incorporated within FC 110.

In addition, MD 120 can be configured to communicate with a radio access network (RAN) 130, which can comprise one or more cellular base stations (e.g., 2G, 3G, 4G LTE, etc.), one or more access points (e.g., WiFi), as well as other radio access technologies known to persons of ordinary skill. Furthermore, MD 120 can be configured to access via RAN 130 the network 140 (also referred to herein as cloud 140), which in various exemplary embodiments can be the public Internet, a private Intranet (e.g., enterprise network), etc. Cloud 140 can comprise a remote data storage (RDS) facility 150 (e.g., Amazon Web Services (AWS)), which can be configured to be accessible via a web portal 160. In such embodiments, MD 120 can be configured to access a particular portion (e.g., user account) of RDS 150 via web portal 160 using one or more protocols including, e.g., HTTP, HTTPS, FTP, TFTP, SMTP, UDP, TCP, IP, or other Internet-centric protocols known to persons of ordinary skill. In various embodiments, web portal 160 can comprise a file browser that provides users with various capabilities to view and/or manipulate the contents of RDS 150 and/or the various associations described above (e.g., by administrator privileges). [QUESTION: Any provision of the MD application by server/web portal?]

In addition, system 100 can be configured such that other users (e.g., user of computer 170) can also access the same portion of RDS 150 via web portal 160. Such other users can include third-party service providers such as, e.g., agronomists, sales representatives, etc. For example, the system 100 can be configured with one or more service accounts (e.g. for a particular grower), each of which can be associated with a plurality of user accounts and a plurality of FCs (e.g., FC 110) and/or ABDs (e.g., ABD 175). In some embodiments, each of the user accounts can be associated with one or more FCs and/or ABDs, in which case the particular user can have greater privileges with respect to the associated FCs/ABDs than with respect to other FCs/ABDs. In some embodiments, each service account can be associated with one or more MDs (e.g., MD 120), each of which can be further associated with one or more FCs and/or ABDs.

Figure 2:
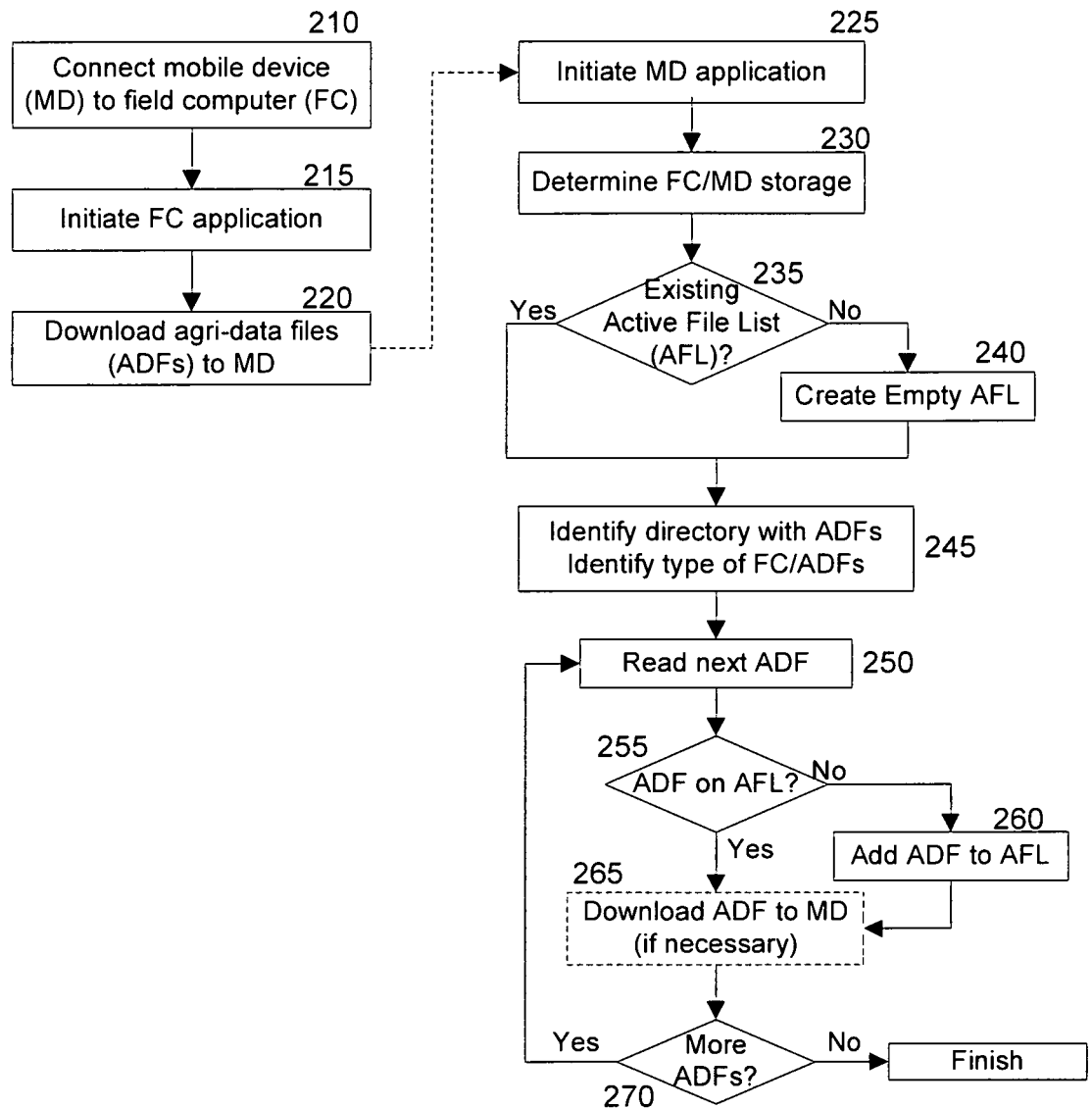
FIG. 2 is an exemplary flow diagram of an exemplary method and/or procedure for selectively transferring data (e.g., agricultural data files) from a mobile computer (e.g., a field computer (FC) or other application-specific computing device) to a mobile communication device (MD), according to one or more exemplary embodiments of the present disclosure.

FIG. 2 is an exemplary flow diagram of an exemplary method and/or procedure (also referred to herein as an application) for selectively transferring data (e.g., ADFs) from a mobile computer (e.g., FC 110) to a mobile communication device (e.g., MD 120), according to one or more exemplary embodiments of the present disclosure. Although the method and/or procedure is illustrated by blocks in the particular order shown in FIG. 2, this order is merely exemplary and the steps can be performed in different orders and can be combined and/or divided into blocks having different functionality than shown in FIG. 2.

In block 210, the mobile communication device (MD) is connected to the mobile computer (FC) or, equivalently, the FC is connected to the MD. In various exemplary embodiments, the connection can be a wired connection (e.g., USB) or a short-to-mid-range wireless connection (e.g., Bluetooth, WiFi, Wireless USB, NFC, etc.). In block 215, a data transfer application is initiated on the FC. This can be done in various ways including, for example, selection of a particular option using the FC user interface (UI). In some embodiments, the application initiated in block 215 can be configured to access the connected MD as a remote storage device, e.g., as a USB slave storage device. Such configuration can be done automatically (e.g., by default) or by manual selection via FC UI. In block 220, the FC downloads one or more agricultural data files (ADFs) to the MD. For example, the FC can be configured to download all ADFs in a particular directory, all ADFs having a revision after the most recent download, or particular ADFs selected manually via the FC UI.

In block 225, a data transfer application is initiated on the MD. This can be done in various ways including, for example, selection of a particular option using the MD user interface (UI). Moreover, the application can be initiated at various times including after completing the operations in blocks 210-220, as illustrated by the dashed line between blocks 220 and 225. In such case, the files to be operated on in blocks 225-270 are already stored on the MD. In other exemplary embodiments, the operations of blocks 225-270 can be performed on files that are still resident on the FC. In such embodiments, the application initiated in block 225 can be configured to access the connected FC as a remote storage device, e.g., as a USB slave storage device. Such configuration can be done automatically (e.g., by default) or by manual selection via MD UI. To summarize, some exemplary embodiments of the technique and/or method shown in FIG. 2 can comprise blocks 210-270 while others can comprise only blocks 225-270.

In block 230, the application determines the source of files to review, i.e., whether the files to be reviewed are stored on the MD or are still resident on the FC. Such determination can be done automatically (e.g., by default) or by manual selection via MD UI. Other alternatives will be readily apparent to persons of ordinary skill. One or more of the operations in blocks 235-270 can be configured to be executed based on the result of block 230. Next, in block 235, the application determines whether an active file list (AFL) is in existence. In various exemplary embodiments, the AFL can comprise a list of files that have been transferred from the FC, are resident on the MD, and have not been transferred to a third location, e.g., remote storage 150 shown in FIG. 1. If no AFL exists, an empty AFL is created in block 240 before proceeding on to block 245; if an AFL does exist, the method and/or procedure proceeds directly to block 245.

In block 245, the exemplary method and/or procedure identifies one or more directories comprising ADFs and/or the format or type of ADFs included in the one or more directories. The operations of block 245 can be performed in various ways, such as the technique described below with reference to FIG. 3. However, one or more of the directory and the ADF format can be determined in various other ways, e.g., by default setting, by manual input via the MD UI, etc. Next, in block 250, the application reads the next ADF included in a directory determined in block 245, according to the particular ADF format also determined in block 245. In block 255, the application determines whether the ADF read in block 250 is on the AFL. This can be done by, e.g., comparing metadata pertaining to the ADF read in block 250 against metadata included in the entries in the AFL. Such metadata can include filename string, filename hash, file contents hash, revision date, file length, etc. If the AFL does not include the read file, the AFL is updated in block 260 to include the read file before proceeding on to block 265; otherwise, the method and/or procedure proceeds directly to block 265 where, depending on the result of block 230, the read file can be downloaded from the FC to the MD as necessary. Next, in block 270, the exemplary method and/or procedure determines whether more ADFs exist in the one of more directories determined in block 245. As shown in FIG. 2, the operations of blocks 250-270 can be repeated so long as block 270 yields a "Yes" result.

Although not shown in FIG. 2, the exemplary method and/or procedure also can include uploading the ADFs identified by the AFL to a remote storage location. In the context of the exemplary system shown in FIG. 1, after compiling the AFL according to the operations shown in FIG. 2, MD 120 can access remote storage 150 via web portal 160 in response to one or more events, such as timer expiration, a user interface (UI) input, availability of a wireless connection to RAN 130, etc. MD 120 can be further configured to transfer all ADFs on the AFL to remote storage 150 in conjunction with accessing via web portal 160. Alternately, MD 120 can be configured to selectively transfer a portion of ADFs on the AFL according to user input, e.g., via MD UI. In some embodiments, MD 120 can be further configured to translate one or more ADFs comprising the AFL to a different format prior to uploading them to remote storage 150 via web portal 160.

Figure 3:
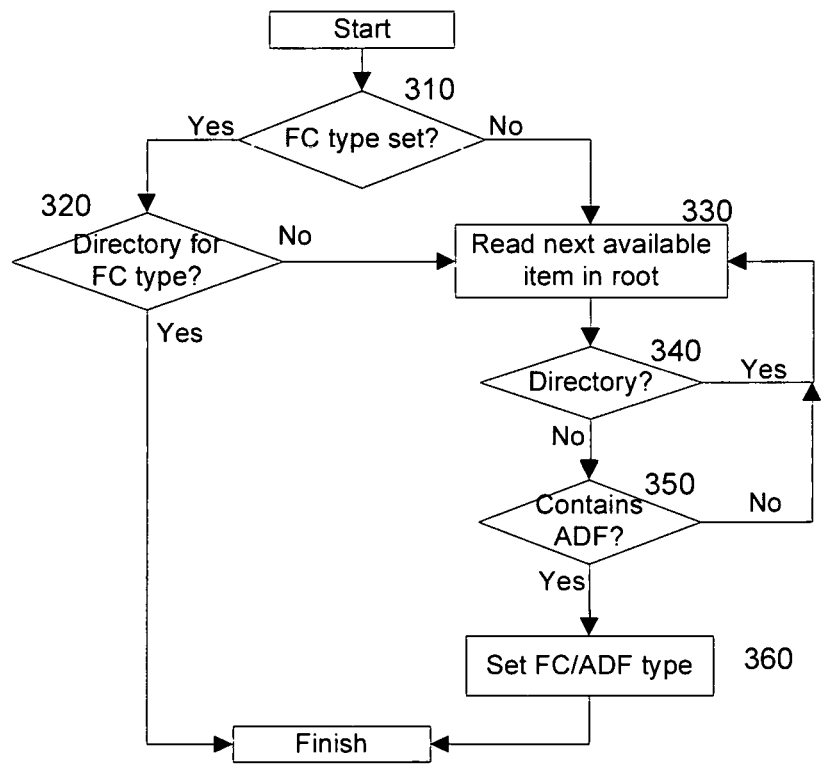
FIG. 3 is an exemplary flow diagram of an exemplary method and/or procedure for identifying one or more directories comprising agricultural data files (ADFs) and/or a format or type of ADFs in the one or more directories, according to one or more exemplary embodiments of the present disclosure.

FIG. 3 is an exemplary flow diagram of an exemplary method and/or procedure (also referred to herein as an application) for identifying one or more directories comprising ADFs and/or a format or type of ADFs in the one or more directories, according to one or more exemplary embodiments of the present disclosure. Such an exemplary method and/or procedure can be performed in a mobile communication device (e.g., MD 120) and can be employed, for example, in block 245 of the exemplary method and/or procedure shown in FIG. 2. Although the method and/or procedure is illustrated by blocks in the particular order shown in FIG. 3, this order is merely exemplary and the steps can be performed in different orders and can be combined and/or divided into blocks having different functionality than shown in FIG. 3.

In block 310, the application determines whether a configuration for a particular type of field computer (FC) exists. Such a configuration can exist, for example, from a previous execution of the blocks shown in FIG. 3, from a default setting of the application, from a selection made via the MD UI, etc. If an FC type has not been configured, the application proceeds directly to block 330; otherwise, the application proceeds to block 320 where operations are performed to search for a particular directory structure known to be associated with the configured FC type. If the particular directory structure is not found, the application also proceeds to block 330. However, if the directory structure is found, the exemplary method and/or procedure finishes.

In block 330, the application reads an item in the root directory of a particular storage volume associated with either the FC or the MD. The choice of storage volume can be based, for example, on the outcome of block 230 in FIG. 2. In block 340, the application determines if the read item is a directory; if so, it returns to block 330 to read the next item. On the other hand, if the read item is a file, the application determines in block 350 whether the read item is an ADF. This can be done in various ways including, e.g., comparing the structure of the read item with known structures pertaining to ADFs generated by equipment from various manufacturers such as, e.g., Raven, Trimble, AgLeader, etc.; comparing content of the read item (e.g., metadata) with known content pertaining to ADFs generated by such equipment; comparing the directory and/or one or more subdirectories in which the read item is stored with known directory structured used by such equipment, etc. If the operation of block 350 determines that the read item is not a directory, the application returns to block 330 to read the next item. The skilled person will readily comprehend that such operations can be configured to be performed on items in sub-directories once all items in the root directory have been reviewed.

In some exemplary embodiments, the operation of block 340 can comprise comparing the structure of a directory, such as the directory comprising the read item, with known directory structures generated by various manufacturers' equipment. In some exemplary embodiments, the operation of block 350 can comprise comparing the content of the read item with known content generated by various manufacturers' equipment. Other exemplary embodiments can comprise identification by more than one of such comparisons. In any event, if the operation of block 350 determines a particular ADF type, the operation of block 360 identifies the particular ADF format and/or type and one or more particular directories in which the ADFs are found based on the results of the previous blocks. Such information can be used, for example, in the exemplary method and/or procedure illustrated by FIG. 2.

Figure 4:
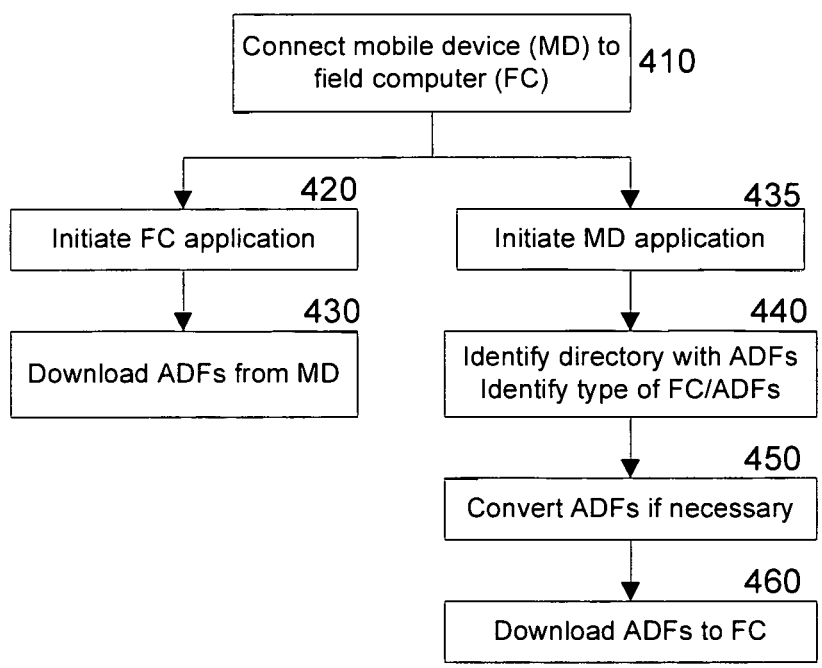
FIG. 4 is an exemplary flow diagram of an exemplary method and/or procedure for selectively transferring one or more ADFs from a mobile communication device (MD) to a mobile computer (e.g., FC), according to one or more exemplary embodiments of the present disclosure.

FIG. 4 is an exemplary flow diagram of an exemplary method and/or procedure for selectively transferring one or more ADFs from a mobile communication device (MD) to a mobile computer (e.g., FC), according to one or more exemplary embodiments of the present disclosure. In various embodiments, this exemplary method and/or procedure can be performed after the one or more ADFs have been downloaded from remote storage (e.g., remote storage 150 via web portal 160) to the MD. In some embodiments, an AFL can be formed based on the one or more ADFs downloaded from remote storage, and the AFL used to identify ADFs for processing according to one or more operations shown in FIG. 4. Although the method and/or procedure is illustrated by blocks in the particular order shown in FIG. 4, this order is merely exemplary and the steps can be performed in different orders and can be combined and/or divided into blocks having different functionality than shown in FIG. 4.

In block 410, the mobile communication device (MD) is connected to the mobile computer (FC) or, equivalently, the FC is connected to the MD. In various exemplary embodiments, the connection can be a wired connection (e.g., USB) or a short-to-mid-range wireless connection (e.g., Bluetooth, WiFi, Wireless USB, NFC, etc.). Subsequently, operations can proceed in two paths: blocks 420-430 performed by the FC, or blocks 440-460 performed by the MD. Beginning with the first alternative, in block 420, a data transfer application is initiated on the FC. This can be done in various ways including, for example, selection of a particular option using the FC UI. In some embodiments, the application initiated in block 420 can be configured to access the connected MD as a remote storage device, e.g., as a USB slave storage device. Such configuration can be done automatically (e.g., by default) or by manual selection via FC UI. In block 430, the FC downloads one or more agricultural data files (ADFs) from the MD. For example, the FC can be configured to download all ADFs in a particular directory, all ADFs having a revision after the most recent download, all ADFs comprising an AFL, or particular ADFs selected manually via the FC UI.

According to the second alternative, in block 435, a data transfer application is initiated on the MD. This can be done in various ways including, for example, selection of a particular option using the MD UI. In some embodiments, the application initiated in block 420 can be configured to access the connected FC as a remote storage device, e.g., as a USB slave storage device. Such configuration can be done automatically (e.g., by default) or by manual selection via MD UI. In block 440, one or more target directories for ADFs on the FC and/or the format or type of ADFs included in the one or more directories are identified. The operations of block 440 can be performed in various ways, such as the technique described below with reference to FIG. 3. However, one or more of the directory and the ADF format can be determined in various other ways, e.g., by default setting, by manual input via the MD UI, etc.

Subsequently, in block 450, one or more ADFs stored on the MC can be optionally converted to a different format, e.g., to the format determined in block 440. This optional conversation, for example, can be employed to provide interoperability between different manufacturers and/or service providers (e.g., FC manufacturer "A" and data analysis/generation service provider "B"). In block 460, one or more agricultural data files (ADFs) (with optional format conversion) are downloaded from the MD to the FC, e.g., to the FC directory identified in block 440. For example, the MD can be configured to download all ADFs stored in a particular MD directory, all ADFs having a revision after the most recent download, all ADFs comprising an AFL, or particular ADFs selected via the MD UI.

Figure 6:
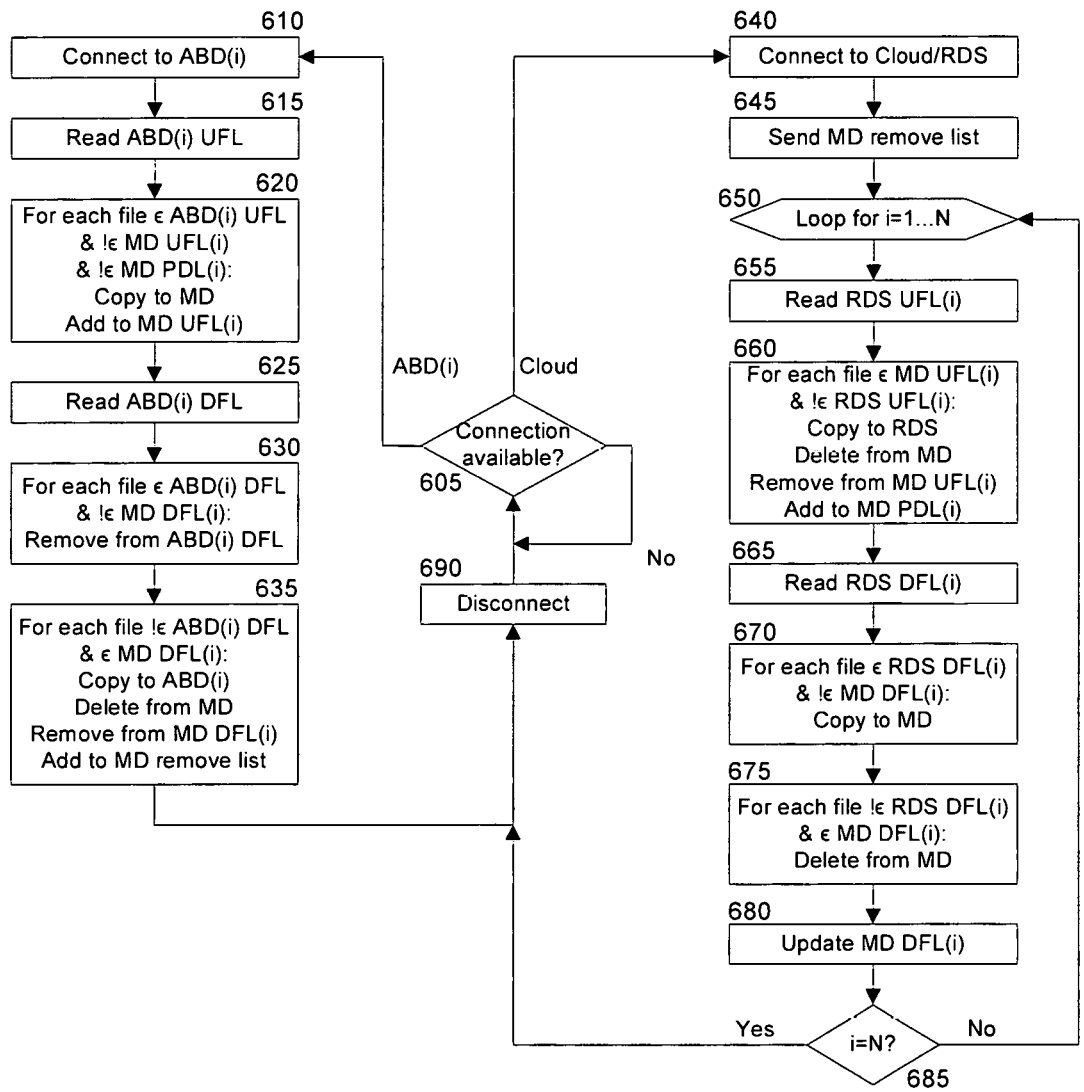
FIG. 6 is an exemplary flow diagram of an exemplary method and/or procedure for selectively transferring data files (e.g., ADFs) between one or more storage devices associated with one or more mobile computers and a remote data storage, according to one or more exemplary embodiments of the present disclosure.

FIG. 6 is an exemplary flow diagram of an exemplary method and/or procedure of a mobile communication device (MD) for selectively transferring data files (e.g., ADFs) between one or more storage devices (e.g., ABD 175 in FIG. 1) associated with one or more mobile computers (e.g., FC 110 in FIG. 1), and a remote or "cloud" data storage facility (e.g., RDS 150 in FIG. 1), according to one or more exemplary embodiments of the present disclosure. Although shown and described in terms of communication between MDs and ABDs, the exemplary method and/or procedure shown in FIG. 6 can also be utilized in embodiments where the ABD functionality is incorporated in the mobile computer itself; as discussed above. In such exemplary embodiments, the communication can be between MDs and FCs. Moreover, although the method and/or procedure is illustrated by blocks in the particular order shown in FIG. 6, this order is merely exemplary and the steps can be performed in different orders and can be combined and/or divided into blocks having different functionality than shown in FIG. 6.

A general predicate to the exemplary method and/or procedure shown in FIG. 6 is a valid association between the MD performing the operations shown, a particular service account, and, in some embodiments, a particular user account, as discussed above with respect to FIG. 1. In addition, the particular service account can be further associated with one or more ABDs (e.g., ABD(i), i=1 . . . N). In some embodiments, the particular user accounts can be further associated with one or more ABDs. Such associations can be performed by the RDS including, e.g., various authentication and/or authorization procedures with the respective users, MDs, and/or ABDs.

For purposes of explanation, the exemplary method and/or procedure of FIG. 6 begins in block 605, where the MD determines whether, and what type of, a connection is available. The types of connections can include a connection to the RDS or "cloud" and connections to one the ABDs (e.g., ABD(i), i=1 . . . N) with which the MD has been associated. This determination can be done periodically without user intervention (e.g., on expiration of an internal timer) and/or occasionally with user intervention (e.g., user interface selection). Moreover, block 605 can include logic that delays searching for a particular connection (e.g., to ABD(i)) if that connection was previously successfully established and disconnected. If no connection is available, the exemplary technique returns to wait for the next determination. However, if the MD determines that a connection is available to one of the ABDs (e.g., ABD(i)), the exemplary technique proceeds to block 610, where the MD connects to ABD(i).

After connecting, in block 615, the MD reads from ABD(i) a list of files that ABD(i) has available for uploading to RDS, referred to hereinafter as the ABD(i) uplink file list (UFL). Next, in block 620, the MD determines if any of these files are newly available, i.e., they are neither stored on the MD for subsequent upload nor have previously been uploaded and removed from the MD. The first condition is determined by comparing ABD(i) UFL to the MD's uplink file list for ABD(i), referred to hereinafter as MD UFL(i). The second condition is determined by comparing ABD(i) UFL to the MD's permanent delete list for ABD(i), referred to hereinafter as MD PDL(i). Files meeting both conditions are copied from ABD(i) to the MD and added to the MD UFL(i).

Similarly, in block 625, the MD reads from ABD(i) a list of files that ABD(i) has stored for downloading to one or more associated FCs, referred to hereinafter as the ABD(i) downlink file list (DFL). Next, in block 630, the MD determines if any of these files are no longer valid due to, e.g., having been superseded or removed from an account associated with the MD and/or ABD(i). The MD removes any such files from ABD(i) DFL or, alternately, instructs ABD(i) to do so. In block 635, the MD determines if there are any newly available files for downloading to ABD(i), e.g., by comparing ABD(i) DFL to the MD's downlink file list for ABD(i), referred to hereinafter as MD DFL(i). Any identified files can be transmitted to ABD(i), deleted from the MD, removed from MD DFL(i), and added to the MD's remove list for future communication with the RDS. Subsequently, after finishing above-described operations, the exemplary method and/or procedure proceeds to block 690 in which the MD disconnects from ABD(i). This operation can occur with or without user intervention.

Once disconnected, the MD returns to block 605 where it determines connection availability as described above. If the MD determines that a connection to the RDS or "cloud" is available, the exemplary technique proceeds to block 640 where such connection is established. In block 645, the MD sends to the RDS its remove list identifying files that have been provided to their intended ABD target(s), as discussed above. In some exemplary embodiments, the RDS can utilize this list to delete the identified files from its own data storage that is associated with the particular service account. In some exemplary embodiments, the RDS can remove the identified files from the list of files to be downloaded to other MDs associated with the same ABD targets.

Beginning in control block 650, the exemplary technique loops for each ABD(i), i=1 . . . N, associated with the MD. In block 655, the MD receives or reads from the RDS a list of files associated with ABD(i) that are currently valid and stored on the RDS, hereinafter referred to as RDS UFL(i). In block 660, the MD determines if there are any newly available ABD(i) files for uploading to RDS, e.g., by comparing RDS UFL(i) to MD UFL(i) discussed above with respect to block 620. Any identified files can be transmitted to the RDS, deleted from the MD, removed from MD UFL(i), and added to MD PDL(i). In block 665, the MD receives or reads from the RDS a list of files associated with or intended for ABD(i) that are currently valid and stored on the RDS, hereinafter referred to as RDS DFL(i). In some exemplary embodiments, RDS DFL(i) can comprise or be a part of a larger file list, e.g., a directory listing of all valid ADFs stored on the RDS that are associated with the particular service account.

In block 670, the MD determines if there are any newly available ABD(i) files for downloading from RDS, e.g., by comparing RDS DFL(i) to MD DFL(i) discussed above with respect to blocks 630 and 635. Any identified files can be retrieved, read, or copied from the RDS. In block 675, by a comparison of RDS DFL(i) to MD DFL(i), the MD determines if it contains any files intended for ABD(i) that are no longer valid, e.g., because they have been superseded or previously transferred to ABD(i) by another MD. Any identified files can be deleted from the MD. In block 680, the MD can update MD DFL(i) by removing the files identified in block 675 and adding the files identified in block 670. Finally, in block 685, the exemplary technique returns to repeat the operations of blocks 650 through 680 for other associated ABDs, or proceeds to block 690 if these operations have been performed for all associated ABDs (i=N).

Figure 5:
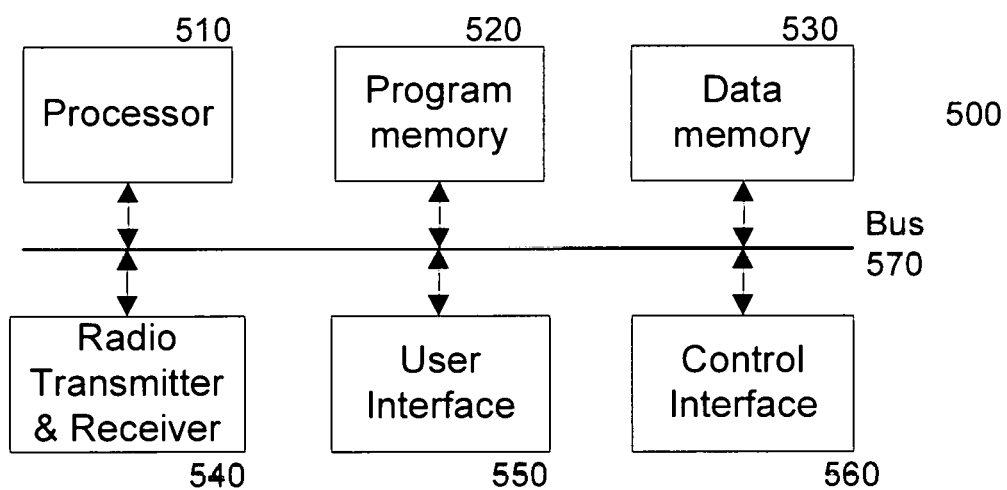
FIG. 5 is a block diagram of an exemplary mobile communication device (MD) and/or apparatus according to one or more exemplary embodiments of the present disclosure.

Although various embodiments are described herein above as a combination of processing blocks of a method or technique, the person of ordinary skill will readily comprehend that such processing blocks can be embodied by various combinations of hardware and software in various systems, computing devices, control devices, apparatuses, non-transitory computer-readable media, etc. FIG. 5 shows a block diagram of an exemplary device or apparatus utilizing certain embodiments of the present disclosure, including various techniques described herein above. Embodiments of the exemplary device or apparatus shown in FIG. 5 and described below can include an end-user device (e.g., mobile phone or tablet), a subscriber terminal (e.g., for machine-to-machine (M2M) communications), a base station (e.g., of a cellular system), an access point (e.g, of a wireless LAN), or any other type of device or apparatus that would benefit from techniques described herein. For example, the exemplary device or apparatus shown in FIG. 5 can be embodied as a mobile device (MD) 120 and/or an AgBridge® drive (ABD) 175 shown in FIG. 1.

Exemplary device 500 can comprise a processor 510 that can be operably connected to a program memory 520 and/or a data memory 530 via a bus 570 that can comprise parallel address and data buses, serial ports, or other methods and/or structures known to those of ordinary skill in the art. Program memory 520 can comprise software code or program executed by processor 510 that facilitates, causes and/or programs exemplary device 500 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1×RTT, CDMA2000, 802.11, WiFi, HDMI, USB, Firewire, etc., or any other protocols utilized in conjunction with radio transceiver 540, user interface 550, and/or host interface 560.

Program memory 520 can also comprises software code executed by processor 510 to control the functions of device 500, including configuring and controlling various components such as radio transceiver 540, user interface 550, and/or host interface 560. Program memory 520 can also comprise an application program or software for performing steps, functions, and/or blocks of methods according to one or more of the embodiments described herein above. Such software code can be specified or written using any known or future developed programming language, such as e.g. Java, C++, C, Objective C, HTML, XHTML, and Assembler, as long as the desired functionality, e.g., as defined by the implemented method steps, is preserved. In addition or alternatively, program memory 520 can comprise an external storage arrangement (not shown) remote from device 500, from which the instructions can be downloaded into program memory 520 located within or removably coupled to device 500, so as to enable execution of such instructions.

Data memory 530 can comprise memory area for processor 510 to store variables used in protocols, configuration, control, data storage, and other functions of device 500, including various techniques according to one or more of the embodiments described herein above. Moreover, program memory 520 and/or data memory 530 can comprise non-volatile memory (e.g., flash memory), volatile memory (e.g., static or dynamic RAM), or a combination thereof. Furthermore, data memory 530 can comprise a memory slot by which removable memory cards in one or more formats (e.g., SD Card, Memory Stick, Compact Flash, etc.) can be inserted and removed. In some embodiments, data memory 530 can comprise data storage (e.g., solid state drive) that is communicably coupled to processor 510, e.g., via radio transceiver 540 and/or control interface 550, which are described in greater detail below.

Persons of ordinary skill in the art will recognize that processor 510 can comprise multiple individual processors (e.g., multi-core processors), each of which implements a portion of the functionality described above. In such case, multiple individual processors can be commonly connected to program memory 520 and data memory 530 or individually connected to multiple individual program memories and or data memories. More generally, persons of ordinary skill in the art will recognize that various protocols and other functions of device 500 can be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 540 can comprise radio-frequency transmitter and/or receiver functionality that enables device 500 to communicate with other equipment supporting like wireless communication standards. In an exemplary embodiment, radio transceiver 540 includes an LTE transmitter and receiver that enable device 500 to communicate with various Long Term Evolution (LTE) networks (also known as "4G") according to standards promulgated by 3GPP. In some exemplary embodiments of the present disclosure, radio transceiver 540 includes circuitry, firmware, etc. necessary for device 500 to communicate with various UMTS and/or GSM/EDGE networks, also according to 3GPP standards. In some exemplary embodiments of the present disclosure, radio transceiver 540 includes circuitry, firmware, etc. necessary for device 500 to communicate with various CDMA2000 networks, according to 3GPP2 standards. In some exemplary embodiments of the present disclosure, radio transceiver 540 is capable of communicating using radio technologies that operate in unlicensed frequency bands, such as IEEE 802.11 WiFi that operates using frequencies in the regions of 2.4 and/or 5.6 GHz. In some exemplary embodiments of the present disclosure, radio transceiver 540 can comprise a transceiver that is capable of wired communication, such as by using IEEE 802.3 Ethernet technology. The functionality particular to each of these embodiments can be coupled with or controlled by other circuitry in device 500, such as processor 510 executing protocol program code stored in program memory 520.

User interface 550 can take various forms depending on the particular embodiment of device 500. In some exemplary embodiments of the present disclosure, user interface 550 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, device 500 can comprise a tablet computing device (such as an iPad® sold by Apple, Inc.) including a larger touchscreen display. In such embodiments, one or more of the mechanical features of user interface 550 can be replaced by comparable or functionally equivalent virtual user interface features (e.g., virtual keypad, virtual buttons, etc.) implemented using the touchscreen display, as familiar to persons of ordinary skill in the art. In other embodiments, device 500 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many exemplary embodiments of device 500 having a touch screen display are capable of receiving user inputs, including inputs related to one or more applications, methods, and/or techniques described herein or known to persons of ordinary skill in the art. In embodiments where device 500 is configured for machine-to-machine (M2M) communication, features of user interface 550 can be very minimal (e.g., one or more push buttons). In such embodiments, any further desired user interface features can be provided remotely by another device to which device 500 communicates.

In some exemplary embodiments of the present disclosure, device 500 can comprise an orientation sensor, which can be used to sense when the user has changed the physical orientation of the device 500's touch screen display. An indication signal from the orientation sensor can be available to any application program executing on device 500, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device.

Control interface 560 of device 500 can take various forms depending on the particular embodiment of device 500 and of the particular interface requirements of the hardware under control of device 500. For example, control interface 560 can comprise an RS-232 interface, an RS-485 interface, a USB interface, an HDMI interface, a Bluetooth interface, or the like. In some exemplary embodiments of the present disclosure, control interface 560 can comprise an IEEE 802.3 Ethernet interface such as described above. In some exemplary embodiments of the present disclosure, control interface 560 can comprise analog interface circuitry including, for example, one or more digital-to-analog (D/A) and/or analog-to-digital (A/D) converters.

Persons of ordinary skill in the art will recognize the above list of features, interfaces, and radio-frequency communication standards is merely exemplary and not limiting to the scope of the present disclosure. In other words, device 500 can comprise more functionality than is shown in FIG.

5 including, for example, a video and/or still-image camera, microphone, media player, etc. Moreover, radio transceiver 540 can include circuitry necessary to communicate using additional radio-frequency communication standards including Bluetooth, GPS, and/or others. Accordingly, processor 510 can execute software code stored in program memory 520 to control such additional functionality.

Figure 7:
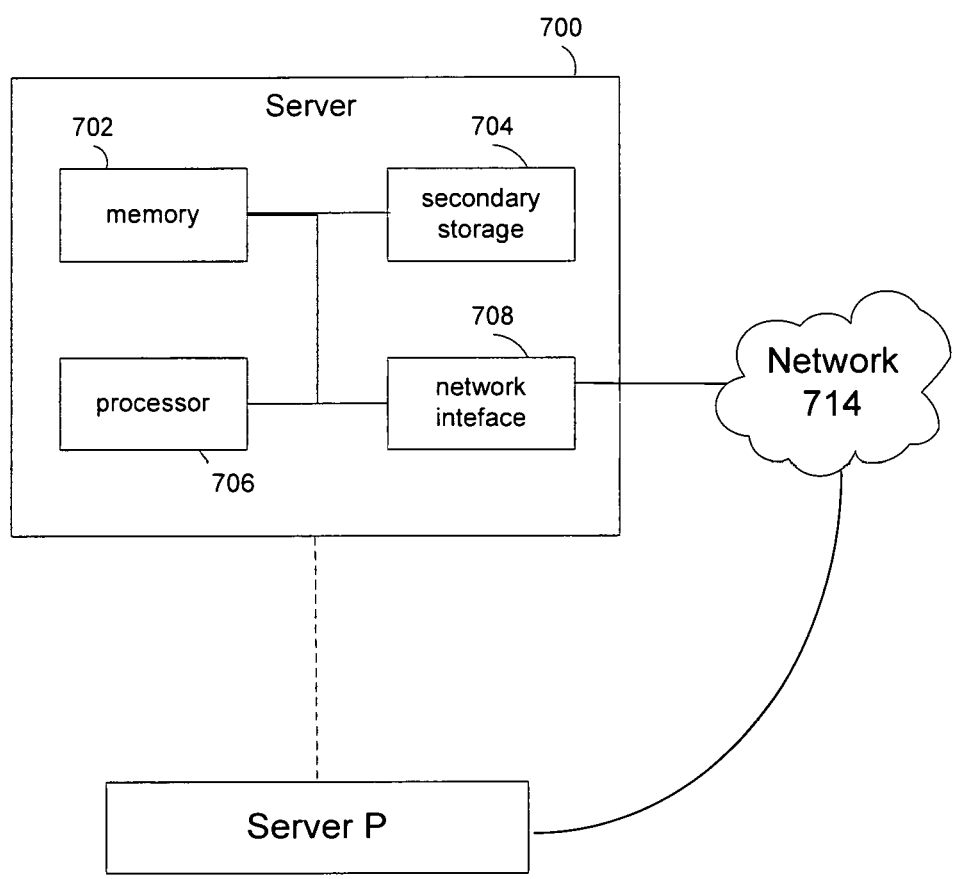
FIG. 7 is a block diagram of an exemplary computer server system according to one or more exemplary embodiments of the present disclosure.

FIG. 7 is a block diagram of an exemplary computer server system that can be utilized in conjunction with certain embodiments of the present disclosure, including as a remote data storage server such as RDS 150 shown in FIG. 1 and discussed above. Server 700 can includes a memory 702, a secondary storage 704, a processor 706, and a network interface 708. Memory 702 can include RAM or similar types of memory, and it can store one or more applications (e g, database applications. communication applications, security applications, etc.) for execution by processor 706. Secondary storage 704 can include a hard disk drive, floppy disk drive, CD-ROM drive, or other types of non-volatile data storage. Processor 706 executes the application(s), which is stored in memory 702 or secondary storage 704, or received from the Internet or other network 714.

Server 700 can store a database structure in secondary storage 704, for example, for storing and maintaining information need or used by the application(s). For example, secondary storage 704 can be used to store information about one or more service accounts, associated user accounts, associated FCs and/or ABDs, and various agricultural data files (ADFs) received from or for transmission to the associated FCs and/or ABDs, as discussed above. Such information can be stored in various forms, e.g., in one or more database structures. Although shown in FIG. 7 as being associated with a single processor 706, secondary storage 704 can comprise M memories or data storage units that are distributed among P servers, each with one or more processors, where M and P are arbitrary numbers dictated by physical and/or economic considerations. Furthermore, the M memories comprising secondary storage 704 can be subdivided in various ways to accommodate the requirements of the service provided.

Also, processor 706 can execute one or more software applications in order to provide the functions described in this specification, specifically in the methods described above, and the processing can be implemented in software, such as software modules, for execution by computers or other machines. The processing can provide and support web pages and other GUIs. The GUIs can be formatted, for example, as web pages in HyperText Markup Language (HTML), Extensible Markup Language (XML) or in any other suitable form for presentation on a display device.

Network interface 708 can comprise transmitters, receivers, and other circuitry that enables server 700 to communicate with other equipment in a packet and/or circuit-switched network for purposes of normal operation, as well as for administration and maintenance of server 700 or other network equipment operably connected thereto. In some embodiments, network interface 708 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

Although server 700 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, redundant array of independent disks (RAID), floppy disks, or CD-ROM; a carrier wave from the Internet or other network; or other forms of RAM or ROM. The computer-readable media can include instructions for controlling a computer system, such as server 700, to perform a particular method.

As described hereinabove, a "file list" or "list of files" refers generally to an identification of a collection, assortment, grouping, etc. of one or more files, and is not limited to any particular format, arrangement, and/or structure. For example, a file list can comprise a plurality of files and/or their identifiers. Although the file identifiers comprising a file list can be ordered in various ways, they are not required to be grouped together or ordered in any particular way. In addition, a file list can be explicit or implicit, e.g., based on a plurality of file identifiers that are organized and/or proximate in some recognizable manner. Furthermore, a file list does not have to be independent of other file lists; rather, the identifiers comprising a particular file list can also comprise a different (e.g., larger) file list.

As described herein, a device or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus can be regarded as a device or apparatus, or as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and numbered paragraphs thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein by its entirety.

What is claimed is:

1. A computer server system for providing manufacturer-independent interface to one or more mobile computers via a plurality of mobile communication devices, comprising:

at least one processor;
a data storage that is accessible via one or more service accounts;
at least one memory comprising computer-executable instructions that, when executed by the at least one processor, cause the system to:
  associate a particular service account with a first mobile computer, a first mobile communication device, and a second mobile communication device;
  transmit to the first and second mobile communication devices, via available communication channels, a first download list identifying files to be transferred to a first storage device associated with the first mobile computer;
  receive from the first mobile communication device a first remove list identifying files transferred by the first mobile communication device to the first storage device;
  delete files identified on the first remove list from the portion of the data storage associated with the particular service account;
  create a second download list comprising the first download list but not the first remove list; and
  transmit to the second mobile communication device, via an available communication channel, the second download list.

2. The computer server system of claim 1, wherein the at least one memory further comprises computer-executable instructions that, when executed by the at least one processor, cause the system to:
  associate the particular service account with the portion of the data storage and with a plurality of user accounts; and
  associate each of the user accounts with at least a portion of the one or more mobile computers.

3. The computer server system of claim 1, wherein the at least one memory further comprises computer-executable instructions that, when executed by the at least one processor, cause the system to:
  receive from the first mobile communication device one or more files that have been uploaded from the first storage device and that are not stored in the data storage associated with the particular service account; and
  transmit to the first mobile communication device one or more files to be downloaded to the first storage device and that are not stored in the first mobile communication device.

4. The computer server system of claim 1, wherein the first storage device can be removably connected to the first mobile computer.

5. The computer server system of claim 1, wherein the first storage device is integral with the first mobile computer.

6. The computer server system of claim 1, wherein the at least one memory further comprises computer-executable instructions that, when executed by the at least one processor, cause the system to provide a web portal by which the first and second mobile communication devices can access the data storage associated with the particular service account.

7. The computer server system of claim 1, wherein the first mobile computer is an agricultural field computer and the files to be transferred to the first storage device comprise agricultural data files.

8. A non-transitory, computer-readable medium comprising computer-executable instructions for a computer server system having data storage accessible via one or more service accounts, wherein, when executed by at least one processor, the instructions configure the computer server system to:
  associate a first service account with a first mobile computer, a first mobile communication device, and a second mobile communication device;
  transmit to the first and second mobile communication devices, via available communication channels, a first download list identifying files to be transferred to a first storage device associated with the first mobile computer;
  receive from the first mobile communication device a first remove list identifying files transferred by the first mobile communication device to the first storage device;
  delete files identified on the first remove list from the data storage associated with the particular service account;
  create a second download list comprising the first download list but not the first remove list; and
  transmit to the second mobile communication device, via an available communication channel, the second download list.

9. The non-transitory, computer-readable medium of claim 8, further comprising computer-executable instructions that, when executed by the at least one processor, cause the system to:
  associate the particular service account with a portion of the data storage and with a plurality of user accounts; and
  associate each of the user accounts with at least a portion of the one or more mobile computers.

10. The non-transitory, computer-readable medium of claim 8, further comprising computer executable instructions that, when executed by the at least one processor, cause the system to:
  receive from the first mobile communication device one or more files that have been uploaded from the first storage device and that are not stored in the data storage associated with the particular service account; and
  transmit to the first mobile communication device one or more files to be downloaded to the first storage device and that are not stored in the first mobile communication device.

11. The non-transitory, computer-readable medium of claim 8, wherein the at least one memory further comprises computer-executable instructions that, when executed by the at least one processor, cause the system to provide a web portal by which the first and second mobile communication devices can access the data storage associated with the particular service account.

* * * * *